United States Patent
Akervall et al.

(10) Patent No.: US 9,658,115 B2
(45) Date of Patent: May 23, 2017

(54) TEMPERATURE MEASURING DEVICE, TEMPERATURE MEASURING DEVICE SET AND METHOD FOR CONFIGURING A TEMPERATURE MEASURING DEVICE THAT CAN BE OPERATED WITH A THERMOCOUPLE

(71) Applicant: Testo AG, Lenzkirch (DE)

(72) Inventors: Jens Akervall, Billdal (SE); Martin Rombach, Lenzkirch (DE); Wolfgang Schwörer, Löffingen (DE)

(73) Assignee: Testo AG, Lenzkirch (DE)

( * ) Notice: Subject to any disclaimer, the term of this patent is extended or adjusted under 35 U.S.C. 154(b) by 438 days.

(21) Appl. No.: 14/380,531

(22) PCT Filed: Jan. 9, 2013

(86) PCT No.: PCT/EP2013/000035
§ 371 (c)(1),
(2) Date: Aug. 22, 2014

(87) PCT Pub. No.: WO2013/124021
PCT Pub. Date: Aug. 29, 2013

(65) Prior Publication Data
US 2015/0030053 A1 Jan. 29, 2015

(30) Foreign Application Priority Data
Feb. 23, 2012 (DE) .......... 10 2012 003 614

(51) Int. Cl.
*G01K 7/02* (2006.01)

(52) U.S. Cl.
CPC ................ *G01K 7/023* (2013.01)

(58) Field of Classification Search
CPC ....................... G01K 7/023
See application file for complete search history.

(56) References Cited

U.S. PATENT DOCUMENTS

| 4,466,749 A | * | 8/1984 | Cunningham | G01K 7/021 374/134 |
| 6,850,859 B1 | * | 2/2005 | Schuh | G01D 18/008 324/105 |
| 7,168,852 B2 | * | 1/2007 | Linnarsson | C22C 33/08 374/139 |

(Continued)

FOREIGN PATENT DOCUMENTS

| CN | 101084420 A | * 12/2007 | ............... G01K 7/04 |
| DE | 7306242 | 7/1973 | |

(Continued)

*Primary Examiner* — Minh Phan
*Assistant Examiner* — Leon W Rhodes, Jr.
(74) *Attorney, Agent, or Firm* — Volpe and Koenig, P.C.

(57) ABSTRACT

In a temperature measuring device set (1) with at least one thermocouple (2) and a temperature measuring device (3) that can be connected to the thermocouple (2) in order to measure a temperature, according to the invention a measurement sensor (13, 14) for measuring or detecting a magnetic property is arranged on at least one opposing contact element (11, 12) mating with a contact element (9, 10) of the thermocouple (2), in order to automatically provide specific information or a characteristic curve of the connected thermocouple (2) on the basis of an output signal of the measurement sensor (13, 14).

12 Claims, 1 Drawing Sheet

(56) References Cited

U.S. PATENT DOCUMENTS

| | | | |
|---|---|---|---|
| 7,980,888 B1 * | 7/2011 | Fukushima | H01R 13/6683 439/489 |
| 9,064,624 B2 * | 6/2015 | Aoki | H01F 7/02 |
| 9,297,705 B2 * | 3/2016 | Aggarwal | G01K 1/02 |
| 2010/0286842 A1 | 11/2010 | Aggarwal et al. | |
| 2011/0299567 A1 | 12/2011 | Rud et al. | |
| 2014/0287601 A1 * | 9/2014 | Suh | H01R 13/6205 439/39 |

FOREIGN PATENT DOCUMENTS

| | | | | |
|---|---|---|---|---|
| DE | 69533601 T2 * | 11/2005 | | G01K 7/12 |
| JP | H10199822 | 7/1998 | | |

* cited by examiner

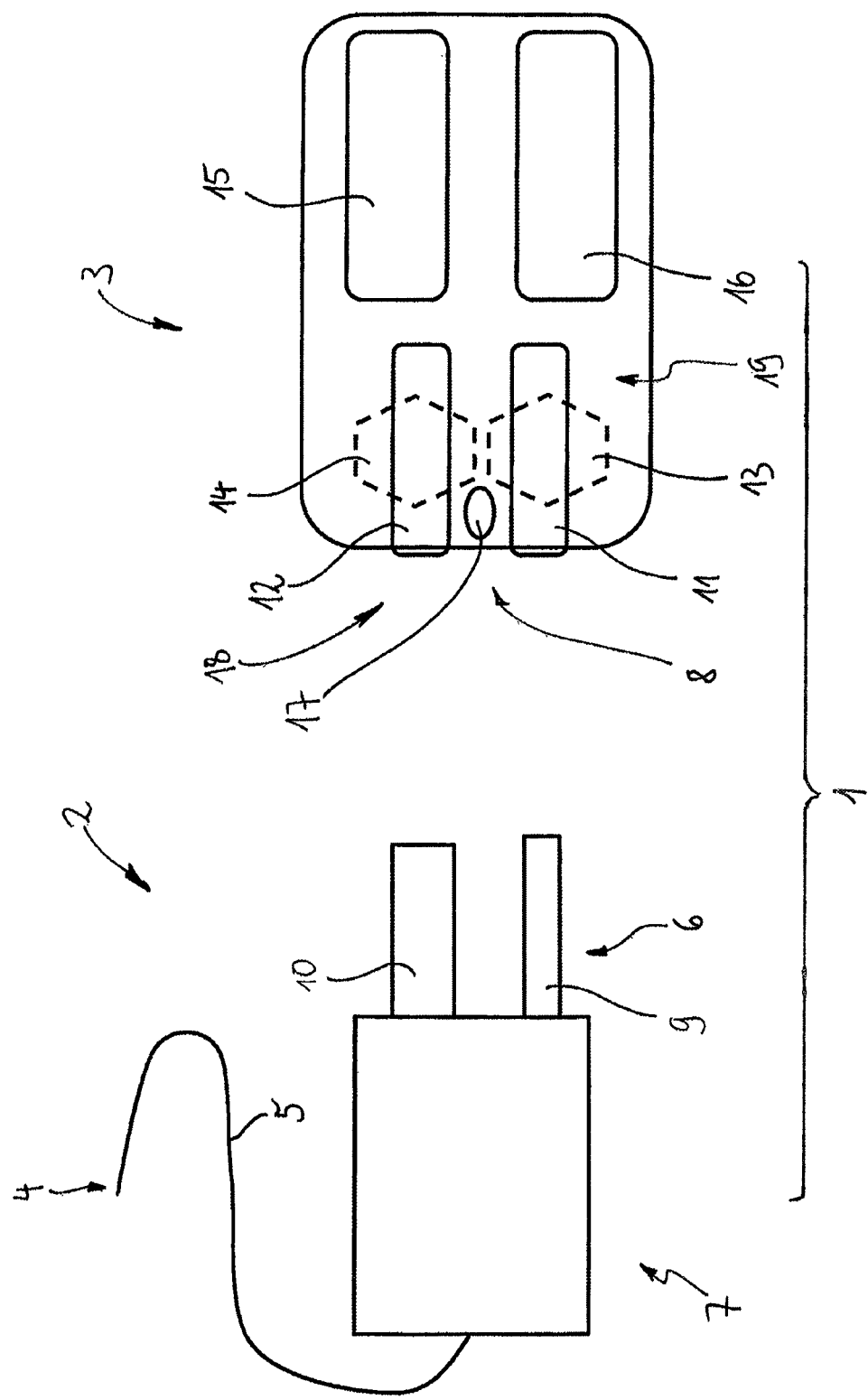

TEMPERATURE MEASURING DEVICE, TEMPERATURE MEASURING DEVICE SET AND METHOD FOR CONFIGURING A TEMPERATURE MEASURING DEVICE THAT CAN BE OPERATED WITH A THERMOCOUPLE

BACKGROUND

The invention relates to a temperature measuring device having at least two mating contact elements which are designed to receive in each case one contact element of a thermocouple.

The invention further relates to a temperature measuring device set having a thermocouple which is produced from two different metals which are connected to one another at a measurement point of the thermocouple, wherein the thermocouple has at least two contact elements which form a comparison point for temperature measurement, and having a temperature measuring device for evaluating the thermocouple.

The invention finally relates to a method for configuring a temperature measuring device that can be operated with a thermocouple.

Temperature measuring device sets of this kind are known and are used for temperature measurement with a thermocouple. In this case, the thermocouple converts a temperature difference between a measurement point and a comparison point into an electrical voltage signal between the contact elements.

The temperature measuring device records this electrical voltage and provides a temperature measurement value relating to said electrical voltage.

In order to cover different temperature measurement ranges, it is known to use various combinations of material in the thermocouple.

By way of example, thermocouples of type J, K and T are known, in which the connecting lines between the measurement point and the comparison point of the thermocouple are produced from respectively different pairings of metal materials. These different materials are electrically conductively connected to one another at the measurement point. Other types of thermocouples are also known.

In order to be able to ascertain a relevant temperature measurement value from the generated electrical voltage, a corresponding characteristic curve is stored in the temperature measuring device. In this case, a specific characteristic curve is stored for each combination of material of the thermocouple, that is to say for each type of thermocouple, since each combination of material converts the temperature difference between the measurement point and the comparison point into a voltage signal in a different way.

In this case, it is customary for a user of a temperature measuring device to in each case set the type of thermocouple with which the temperature measurement is to be carried out in the present case.

If the wrong type of thermocouple is set, the temperature which prevails at the measurement point may be incorrectly measured.

SUMMARY

The invention is based on the objective of improving the operator control properties of a temperature measuring device.

In order to achieve this objective, the invention makes provision, in a temperature measuring device of the kind described in the introductory part, for a first measurement sensor to be arranged on at least one first mating contact element of the at least two mating contact elements, it being possible for a magnetic property of a contact element which is plug-connected to the first mating contact element to be detected using said first measurement sensor. The invention therefore makes use of the knowledge that the different metal materials which are used in the different types of thermocouple have different magnetic properties. These different magnetic properties can be detected using the first measurement sensor, so that it is possible to identify the type of thermocouple currently in use.

In a refinement of the invention, provision can be made for the mating contact elements of the temperature measuring device to be included in a plug receptacle. In this case, the plug receptacle therefore has the at least two or precisely two mating contact elements. In this case, provision can be made for the plug receptacle to be designed and shaped for a matching connection plug of the thermocouple. This connection plug can have the contact elements which can be connected to the mating contact elements and are connected to said mating contact elements in the use position. It is advantageous in this case for thermocouples with standard connection plugs to be used on the temperature measuring device according to the invention since the plug receptacle is matched to the size and/or the shape and/or the number of contact elements of the connection plug.

In order to be able to operate the temperature measuring device according to the invention with a commercially available thermocouple of which the connection plug has plug pins as contact elements, the mating contact elements can be designed as plug sockets. In further refinements, the contact elements can be designed as plug sockets, and the mating contact elements can be designed as matching plug pins.

In order to be able to move the connection point of the thermocouple into the temperature measuring device, the contact elements can be produced from the same metal materials from which the connecting lines of the thermocouple, which form the limbs of the thermocouple, are also produced. Each contact element can therefore be a constituent part of a limb of the thermocouple.

In one refinement of the invention, provision can be made for a second measurement sensor to be arranged on a second mating contact element of the at least two mating contact elements, it being possible for a magnetic property of a contact element, which is plugged into the second mating contact element, to be detected using said second measurement sensor. In this case, it is advantageous for it to be possible to distinguish between an even greater number of types of thermocouple in this way since magnetic properties of both or two contact elements of the thermocouple can be recorded and evaluated separately from one another.

Provision can be made for the first measurement sensor and/or the second measurement sensor to be read by a drive unit, wherein the drive unit provides a characteristic curve or a specific item of information about the plugged-in thermocouple depending on an output signal from the first measurement sensor and/or from the second measurement sensor. In this case, it is advantageous for it to be possible for automatic configuration of the temperature measuring device to be carried out, it being possible for the temperature measuring device to be matched to the inserted thermocouple by way of said automatic configuration. In this case, the configuration can be performed by providing a characteristic curve which matches the detected type of thermocouple, wherein an output voltage from the thermocouple can be processed with the characteristic curve. Therefore, additional configuration steps can be dispensed with, and a typical fault source, which involves the incorrect selection of a characteristic curve for an inserted thermocouple, is precluded when a temperature measuring device is used.

In one refinement of the invention, provision can be made for characteristic curves for at least two different types of thermocouple to be stored in a memory unit. In this case, it is advantageous for it to be possible for the measuring device to be operated with different thermocouples.

Provision can be made for it to be possible for the characteristic curves which are stored in the memory unit to be selected and/or provided by the drive unit depending on the output signal from the first measurement sensor and/or from the second measurement sensor. In this case, it is advantageous for the respectively matching characteristic curve to be provided in an automated manner, as a result of which measurement errors can be avoided.

In this case, the characteristic curves can be stored as a characteristic curve table or as a set of parameters for a parameterized characteristic curve. In the second case, the parameters are defined depending on the output signal from the first and/or from the second measurement sensor, wherein in the first case the table values are provided depending on the output signal.

In one refinement of the invention, provision can be made for a temperature sensor to be arranged on the or on a plug receptacle or in the physical vicinity of the mating contact elements or between the mating contact elements, said temperature sensor defining the comparison point of the thermocouple. In this case, it is advantageous for it therefore to be possible for not only the temperature difference between the measurement point and the comparison point to be measured, but also for it to be possible for the absolute temperature value at the measurement point to be calculated by the temperature at the comparison point being measured and added to the temperature difference.

In one refinement of the invention, provision can be made for the first measurement sensor to be designed to detect a ferromagnetic property. Provision can also be made for the second measurement sensor to be designed to detect a ferromagnetic property. Both measurement sensors are preferably designed to detect in each case the same ferromagnetic properties. In this case, the detection can be performed by the situation of a threshold value for a magnetic material variable being exceeded or undershot being recorded. Detection can also involve measurement of the magnetic material variable.

By way of example, the measurement sensors can interact with the drive unit in such a way that it is possible to identify whether a plugged-in contact element is ferromagnetic or not.

If each mating contact element is equipped with a measurement sensor, it is possible in this way to form decision tables, wherein the different types of thermocouple fall into different fields of the table.

By way of example, provision can be made for the drive unit to be designed to select a characteristic curve of a thermocouple of type T if both contact elements of the plugged-in connection plug are non-ferromagnetic.

In order to detect the ferromagnetic properties, provision can be made for the first measurement sensor and/or the second measurement sensor to be designed as a magnetic field sensor. In this case, provision is preferably made for the magnetic field sensors to be biased. In this case, biased means that a magnetic field is generated in the region of the measurement sensor, said magnetic field being intensified or reduced by virtue of the presence of ferromagnetic materials in the contact element.

By way of example, this bias can be generated by permanent magnets, but it is also possible to use generation of an electromagnetic field.

In one refinement of the invention, provision can be made for a means for connecting the or a connection plug of the thermocouple with the correct orientation to be formed on the or on a plug receptacle. In this case, it is advantageous for it to be possible to distinguish between the contact elements of the connection plug in this way, so that it is possible to distinguish between the case of one contact element being ferromagnetic and the other not being ferromagnetic from the opposite case of the one contact element not being ferromagnetic while the other contact element is ferromagnetic.

The means for connecting the connection plug with the correct orientation can therefore be used to achieve in a simple manner the possibility of connecting a negative limb of the thermocouple only to a specific mating contact element, for example to a first mating contact element, while connecting the positive limb to only the other mating contact element, for example to the second mating contact element. As a result, it is possible to distinguish between an even larger number of different types of thermocouple.

Therefore, the drive unit can be designed such that a characteristic curve of a thermocouple of type J is selected when at least the positive limb or only the positive limb of the plugged-in thermocouple is ferromagnetic. As an alternative or in addition, the drive unit can be designed to select a characteristic curve of a thermocouple of type K when at least the negative limb or only the negative limb of a plugged-in thermocouple is ferromagnetic.

The means for connection with the correct orientation can be formed, for example, by the contact elements and therefore the mating contact elements having different shapes or sizes or arrangements, or by the connection plug and the plug receptacle having geometric shapes which are matched to one another and permit a plug connection only with one orientation.

In the case of a temperature measuring device set of the kind described in the introductory part, provision is made in order to achieve said object for the temperature measuring device to be designed according to the invention, as described. Therefore, a temperature measuring device set which is easy to handle is provided, it being possible to dispense with manual setting of the correct type of thermocouple, this being susceptible to faults, in the case of said temperature measuring device set since the setting operation can be carried out in an automated manner.

It is particularly convenient when the temperature measuring device set contains a plurality of thermocouples of different types. In this way, large temperature measurement ranges can be covered by the temperature measuring device set, and incorrect measurements due to an incorrectly set characteristic curve can be avoided with the invention.

In the case of a method of the kind cited in the introductory part, the invention makes provision in order to achieve said object for, after connection of the thermocouple to the temperature measuring device, a magnetic property of a contact element of the thermocouple to be checked or measured, and for a specific item of information or a characteristic curve of the connected thermocouple to be automatically provided depending on a result of the check or measurement of the magnetic property, in particular for evaluating or processing an output signal from the thermocouple. In this case, it is advantageous for it to be possible to dispense with manual configuration steps, so that incorrect measurements and incorrect manual settings can be avoided. In particular, a check or measurement in respect of whether the material of the contact element or of the contact elements is ferromagnetic is made.

It is particularly expedient when the or a magnetic property is checked or measured for each contact element of the thermocouple separately. In this case, it is advantageous for it to be possible to ascertain which type of thermocouple is currently connected to the temperature measuring device using a decision matrix in which the contact elements and the possible magnetic properties are entered.

The specific item of information can comprise, for example, the display of the detected type of thermocouple. However, it is particularly expedient to provide a characteristic curve of the connected thermocouple, in order to automate the configuration to the greatest possible extent. The characteristic curve is therefore provided for evaluating the temperature-dependent voltage which is generated by the thermocouple and can be evaluated.

BRIEF DESCRIPTION OF THE DRAWINGS

The invention will now be described in greater detail with reference to an exemplary embodiment, but is not restricted to said exemplary embodiment. Further exemplary embodiments are produced by combining individual or several features of the claims with one another and/or with individual or several features of the exemplary embodiment.

FIG. 1 shows a temperature measurement device set according to the invention in a highly schematic illustration for explaining the principle of the invention.

DETAILED DESCRIPTION OF THE PREFERRED EMBODIMENTS

FIG. 1 shows a temperature measuring device set, which is denoted 1 overall, in a highly simplified illustration in which only the components which are described for explaining the invention are shown.

The temperature measuring device set 1 has at least a thermocouple 2 and a temperature measuring device 3.

In this case, the thermocouple 2 is designed in a known manner in order to convert a temperature difference between a measurement point 4 at the free end of a measurement line 5 and a comparison point 6 into an electrical voltage signal.

To this end, the measurement line 5 has two cores which are produced from different metal materials and are connected to one another in a conductive manner at the measurement point 4.

At that end of the measurement line 5 which is situated opposite the measurement point 4, the thermocouple 2 has a connection plug 7 by way of which the thermocouple 2 can be connected to the temperature measuring device 3 and can therefore be connected in an electrically conductive and detachable manner.

In this case, the connection plug 7 can be plugged into a plug receptacle 8 of the temperature measuring device 3.

The connection plug 7 has two contact elements 9, 10 which can be plugged into matching mating contact elements 11, 12 of the plug receptacle 9 for the purpose of electrical connection.

In the exemplary embodiment, the connection plug 7 is designed in a manner which is standard for thermocouples 2.

The contact elements 9, 10 are therefore designed as plug pins. The mating contact elements 11, 12 are designed as plug sockets which match said plug pins.

In further exemplary embodiments, other plug forms can be realized, for example the contact elements 9, 10 can be designed as plug sockets and the mating contact elements 11, 12 can be designed as matching plug pins. The connection plug 7 can also not be integral, as shown, but rather multipartite, wherein the contact elements 9 and 10 can be separable from one another. The plug receptacle can also be integral or multipartite. However, the variant illustrated here with an integral connection plug 7 and an integral plug receptacle 8 according to FIG. 1 is preferred.

The temperature measurement device set 1 can comprise further thermocouples 2 which can be connected to the same temperature measuring device 3. The thermocouple 2 can therefore be exchanged for a further thermocouple of another thermocouple type.

The contact elements 9, 10 are produced from the same metal materials as that core of the measurement line 5 which is directly electrically connected to the respective contact element 9, 10.

In this way, the contact elements 9, 10 form the comparison point 6 for the temperature measurement using the thermocouple 2. This is because this results in the temperature difference between the measurement point 4 and the comparison point 6, on account of the different metal materials of the cores of the measurement line 5, creating a voltage difference between the contact element 9 and the contact element 10.

The cores of the measurement line 5 together with the contact elements 9, 10 are also called the two limbs of the thermocouple 2. By way of example, the contact element 9 together with the associated core forms the positive limb, while the contact element 10 together with the associated core constitutes the negative limb.

A first measurement sensor 13 is arranged on a first mating contact element 11 of the two mating contact elements 11, 12, it being possible to detect a magnetic property of a contact element 9, which is plugged into the first mating contact element 11, using said first measurement sensor.

In this way, it is possible to use the measurement sensor 13 to establish, for example, whether the metal of the contact element 9 is ferromagnetic or not.

A second measurement sensor 14 is arranged on the second mating contact element 12 of the second mating contact elements 11, 12, it being possible to detect a magnetic property of a contact element 9, which is plugged into the second mating contact element 12, using said second measurement sensor.

In the exemplary embodiment, the measurement sensors 13, 14 operate in accordance with an identical measurement principle. In further exemplary embodiments, the measurement sensors 13, 14 can operate in accordance with different physical measurement principles.

The measurement sensors 13, 14 of FIG. 1 are each designed to detect a ferromagnetic property. This is achieved in this case by the measurement sensors 13, 14 each being designed as a magnetic field sensor.

This magnetic field sensor, for example a Hall sensor, can be biased by a magnetic field being generated by a permanent-magnet material or in an electromagnetic manner, said magnetic field changing as soon as a contact element 9, 10 which is composed of a ferromagnetic metal is connected to the respective mating contact element 11, 12.

A drive unit 15 is formed in the temperature measuring device 3, said drive unit reading the first measurement sensor 13 and possibly the second measurement sensor 14 by the output signal from the first measurement sensor 13 and/or from the second measurement sensor 14 being recorded.

The drive unit 15 accesses a memory unit 16 of the temperature measuring device 3, characteristic curves for different types of thermocouple 2 being stored in said memory unit.

These characteristic curves can be stored as value tables or as parameter sets for a parameter-dependent characteristic curve which is stored in a formulaic manner.

The temperature measuring device 3 is designed in a manner which is known per se in this respect in order to use the characteristic curve which matches the thermocouple 2 in each case to record the temperature-dependent electrical voltage which is produced between the contact elements 9 and 10 and to convert said voltage into a temperature value. This temperature value corresponds to the temperature at the measurement point 4 or the temperature difference between the measurement point 4 and the comparison point 6.

In the case of the invention, the drive unit 15 is now additionally designed such that the output signal from the first measurement sensor 13 and/or from the second measurement sensor 14 prompts the selection of a characteristic curve, which is stored in the memory unit 16, for calculating or ascertaining the mentioned temperature value.

This can be achieved, for example, by threshold values for the output signal from the first measurement sensor 13 and/or from the second measurement sensor 14 being pre-specified to the drive unit and, in the event of said threshold values being exceeded or undershot, the drive unit identifying whether a contact element 9, 10 is ferromagnetic or not.

In this case, a 2×2 decision matrix is pre-specified to the drive unit 15, the rows of said decision matrix being associated with the individual measurement sensors 13, 14 and the columns of said decision matrix being associated with the presence of a ferromagnetic metal and the absence of a ferromagnetic metal of the respective contact element 9, 10 on the measurement sensor 13, 14. In further exemplary embodiments, rows and columns can be interchanged or arranged in another way.

The different types of thermocouple and the characteristic curves of said types of thermocouples or further information which is in each case specific to the types of thermocouple are entered in the fields of the decision matrix. An address reference or a link to a characteristic curve or a parameter set can also be entered in each case.

The temperature measuring device 3 further has a temperature sensor 17. The temperature sensor 17 is arranged between the mating contact elements 11, 12 on the plug receptacle 8 in order to be able to measure the absolute temperature at the comparison point 6 when the connection plug 7 is plugged into the plug receptacle 8.

In this way, the measurement signal from the temperature sensor 17 can be used in order to convert the temperature difference between the measurement point 4 and the comparison point 6 into an absolute temperature at the measurement point 4. To this end, the sum of the temperature difference across the thermocouple 2 and the temperature value at the temperature sensor 17 is calculated and output.

A means 18 for connecting the connection plug 7 with the correct orientation is formed on the plug receptacle 8. By way of example, this means can be designed by a shaped portion of the plug receptacle 8 which matches a shaped portion of the connection plug 7 in such a way that the connection plug 7 can be plugged into the plug receptacle 8 only with a pre-specified orientation.

FIG. 1 indicates that the contact elements 9, 10 can have different dimensions, for example different diameters of the plug pins and/or different lengths of the plug pins. This can be utilized for compulsory connection with the correct orientation in such a way that the mating contact elements 11, 12 are each designed to match only one of the contact elements 9, 10.

It is possible to distinguish between the contact elements 9, 10 in the temperature measuring device 3 in this way.

It is therefore possible to distinguish between the so-called positive limb and the so-called negative limb of the thermocouple 2. By way of example, the positive limb of the thermocouple 2 can be associated with the first contact element 9. In this case, the negative limb of the thermocouple 2 is associated with the contact element 10.

It is known that the positive limb has a NiCr alloy, while the negative limb is produced from nickel, in thermocouples 2 of type K. In this case, the NiCr alloy is non-ferromagnetic, while nickel is ferromagnetic.

It is further known that a thermocouple 2 of type J has a positive limb which is comprised of Fe and has a negative limb which is comprised of a CuNi alloy. In this case, iron is ferromagnetic, while the CuNi alloy is non-ferromagnetic.

It is finally known that a thermocouple 2 of type T has a positive limb which is composed of copper and a negative limb which is composed of a CuNi alloy. In this case, copper and the CuNi alloy are each non-ferromagnetic.

In this case, the nature of said decision matrix is therefore that the drive unit 15 displays or outputs the thermocouple of type T or selects or configures the characteristic curve of said thermocouple of type T when no ferromagnetism is detected on the positive limb, that is to say on the measurement sensor 13, and on the negative limb, that is to say on the measurement sensor 14.

This case can also be identified with a single measurement sensor 13 which detects the magnetic property on the mating contact element 11 and on the mating contact element 12.

The decision matrix can furthermore be pre-specified such that a thermocouple of type J is displayed or output or the characteristic curve of said thermocouple of type J is selected or provided when ferromagnetism is detected on the positive limb, that is to say on the first measurement sensor 13, while no ferromagnetism is detected on the negative limb, that is to say on the second measurement sensor 14.

The decision matrix is further designed such that a thermocouple of type K is displayed or output or that the characteristic curve of said thermocouple of type K is selected or provided when no ferromagnetism is detected on the positive limb, that is to say on the first measurement sensor 13, and ferromagnetism is detected on the negative limb, that is to say on the second measurement sensor 14.

In this case, the mating contact elements 11, 12 can be produced from non-ferromagnetic materials and/or from identical materials.

In further exemplary embodiments, the decision matrix can have a different number of columns, for example one column or more than two columns. By way of example, the measurement sensors 13, 14 can be used to measure a magnetic material variable, for example the magnetic susceptibility and/or the magnetic permeability, as the magnetic property. The value range of the magnetic material variable can be divided into a number of sub-regions which are associated with the individual columns of the decision matrix.

In this way, it is possible to distinguish even between different ferromagnetic materials for different thermocouples 2.

It should further be noted that a means 19, not illustrated any further, for detecting a plugged-in connection plug 7 can be formed on the plug receptacle 8.

In this way, it is possible to distinguish between the situation of no thermocouple 2 being plugged in and the case of a thermocouple 2 being plugged in, the contact elements 9, 10 of said thermocouple both being non-ferromagnetic.

Therefore, the described temperature measuring device 3 can be used to execute a method for configuring the temperature measuring device 3, in which method a thermocouple 2 is connected to the temperature measuring device 3. The temperature measuring device 3 checks whether the contact elements 9, 10 of the connection plug 7 have a pre-specified magnetic property. This is done by directly or indirectly measuring a magnetic material property of the respective contact element 9, 10 by means of a respectively associated measurement sensor 13, 14.

In the exemplary embodiment, this is measured by the change in a magnetic field which is generated at the respective measurement sensor 13, 14 being measured or detected, said magnetic field being created by the presence or the plug connection of the respective contact element 9, 10 to the associated mating contact element 11, 12.

In the exemplary embodiment, detection is performed by the situation of a pre-specified threshold value for the output signal from the respective measurement sensor 13, 14 being exceeded or undershot being detected and evaluated.

The method according to the invention using the temperature measuring device 3 then makes provision for a specific item of information or a characteristic curve of the connected thermocouple 2 to be automatically provided depending on the results of the check or measurement of the magnetic property. The characteristic curve can be used when calculating or ascertaining a temperature measurement value for the measurement point 4.

By way of example, said selection and provision can be set up—as explained—with the aid of a decision matrix.

As a result, the temperature measuring device set 1 and, in particular, the temperature measuring device 3 are designed to operate with the thermocouple 2.

In the case of the temperature measuring device set 1 having at least a thermocouple 2 and a temperature measuring device 3, which can be connected to the thermocouple 2 for temperature measurement, it is proposed that a measurement sensor 13, 14 for measuring or detecting a magnetic property be arranged on at least one mating contact element 11, 12, which matches a contact element 9, 10 of the thermocouple 2, in order to automatically select and/or provide a specific item of information or a characteristic curve of the connected thermocouple 2 depending on an output signal from the measurement sensor 13, 14.

The invention claimed is:

1. A temperature measuring device comprising at least two mating contact elements (11, 12) which are configured to each receive one contact element (9, 12) of a plugged-in thermocouple (2), wherein a first measurement sensor (13, 14) is arranged on at least one first mating contact element (11, 12) of the at least two mating contact elements (11, 12), a magnetic property of the contact element (9, 10), which is plug-connected to the first mating contact element (11, 12), being detectable using said first measurement sensor, and the first measurement sensor (13, 14) is readable by a drive unit (15), and the drive unit (15) provides a characteristic curve or a specific item of information about the plugged-in thermocouple (2) depending on an output signal from the first measurement sensor (13, 14).

2. The temperature measuring device (3) as claimed in claim 1, wherein a second measuring sensor (13, 14) is arranged on a second mating contact element (11, 12) of the at least two mating contact elements (11, 12), a magnetic property of the contact element (9, 10), which is plugged into the second mating contact element (11, 12), being detectable using said second measurement sensor.

3. The temperature measuring device (3) as claimed in claim 2, wherein the second measurement sensor (13, 14) is readable by the drive unit (15), wherein the drive unit (15) provides the characteristic curve or the specific item of information about the plugged-in thermocouple (2) depending on an output signal from the first measurement sensor (13, 14) and from the second measurement sensor (13, 14).

4. The temperature measuring device (3) as claimed in claim 2, wherein at least one of the first measurement sensor (13, 14) or the second measurement sensor (13, 14) are designed to detect a ferromagnetic property.

5. The temperature measuring device (3) as claimed in claim 2, wherein at least one of the first measurement sensor (13, 14) or the second measurement sensor (13, 14) are designed as a magnetic field sensor.

6. The temperature measuring device (3) as claimed in claim 1, wherein characteristic curves for at least two different types of thermocouple (2) are stored in a memory unit (16).

7. The temperature measuring device as claimed in claim 6, wherein the characteristic curves which are stored in the memory unit (16) are selectable.

8. The temperature measuring device (3) as claimed in claim 1, wherein a temperature sensor (17) is arranged on a plug receptacle (8) or an area of or between the mating contact elements (11, 12), said temperature sensor defining a comparison point (6) of the thermocouple (2).

9. The temperature measuring device (3) as claimed in claim 1, wherein an alignment element for connecting a connection plug (7) of the thermocouple (2) with a correct orientation is formed on the or on a plug receptacle (8).

10. The temperature measuring device as claimed in claim 1, wherein a second measuring sensor (13, 14) is arranged on a second mating contact element (11, 12) of the at least two mating contact elements (11, 12), a magnetic property of the contact element (9,10), which is plugged into the second mating contact element (11, 12) being detectable using said second measurement sensor; wherein characteristic curves for at least two different types of thermocouple (2) are stored in a memory unit (16); and wherein the characteristic curves are provided by the drive unit (15) depending on the output signal from at least one of the first measurement sensor (13, 14) or the second measurement sensor(13, 14).

11. The temperature measuring device set (1) comprising at least one thermocouple (2) produced from two different metals which are connected to one another at a measurement point (4) of the thermocouple (2), the thermocouple (2) has at least two contact elements (9, 10) which form a comparison point (6) for temperature measurement, and having a temperature measuring device (3) according to claim 1 for evaluating the thermocouple (2).

12. A method for configuring a temperature measuring device (3) that is operatable with a thermocouple (2), comprising connecting the thermocouple (2) to the temperature measuring device (3), and after connection of the thermocouple (2) to the temperature measuring device (3), checking or measuring a magnetic property of a contact element (9, 10) of the thermocouple (2), and automatically generating at least one of a specific item of information or a characteristic curve of the connected thermocouple (2) depending on a result of the check or measurement of the magnetic property.

* * * * *